April 25, 1939.        V. H. SEVERY        2,155,910
CONTAINER SPOUT
Filed Dec. 2, 1937        2 Sheets-Sheet 1

Inventor
Victor H. Severy
By Glenn S. Noble
Atty.

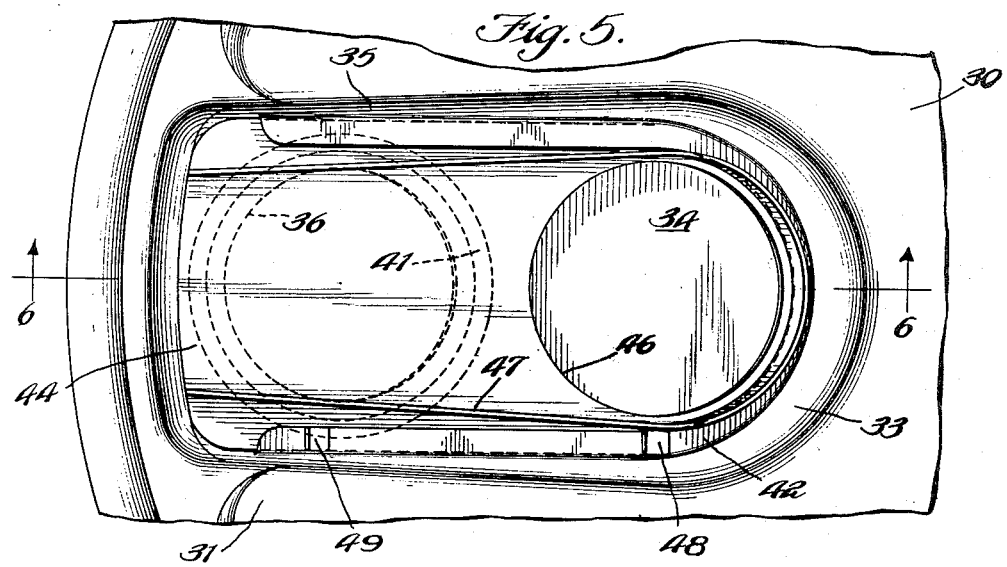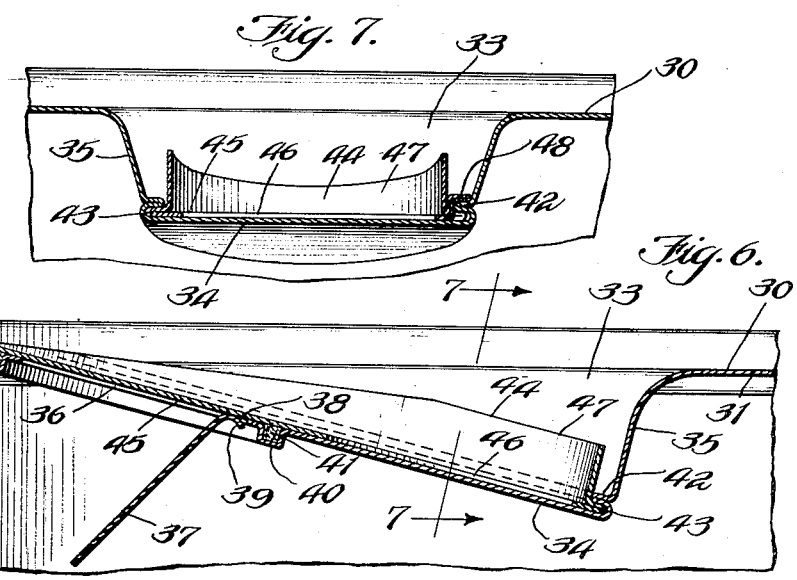

Patented Apr. 25, 1939

2,155,910

UNITED STATES PATENT OFFICE 2,155,910

CONTAINER SPOUT

Victor H. Severy, La Grange, Ill., assignor to Wilson & Bennett Manufacturing Company, Chicago, Ill., a corporation of Illinois Application December 2, 1937, Serial No. 177,769

4 Claims. (Cl. 221—11)

This invention relates to pouring spouts for containers and while it is intended to be used wherever desired, it is particularly intended for sheet metal containers such as steel pails, cans, or the like.

The objects of this invention are to provide an improved container with a novel pouring spout; to provide a container having a spout which is adjustable with respect to the container and which will serve as a closure as well as a pouring means; to provide a slidable spout for containers which may be moved from recessed position to pouring position; to provide a pail having an adjustable pouring spout which may be moved from pouring position to retracted position to permit stacking of the pails; and to provide such other advantages and novel features as will appear from the following description.

In the accompanying drawings illustrating this invention,

Figure 5 is a plan view similar to Figure 1 showing a modified form of construction;

Figure 6 is a sectional view taken on the line 6—6 of Figure 5;

Figure 7 is a cross sectional view taken on the line 7—7 of Figure 6; and

Figure 8 is a perspective view of the spout.

Figure 1:
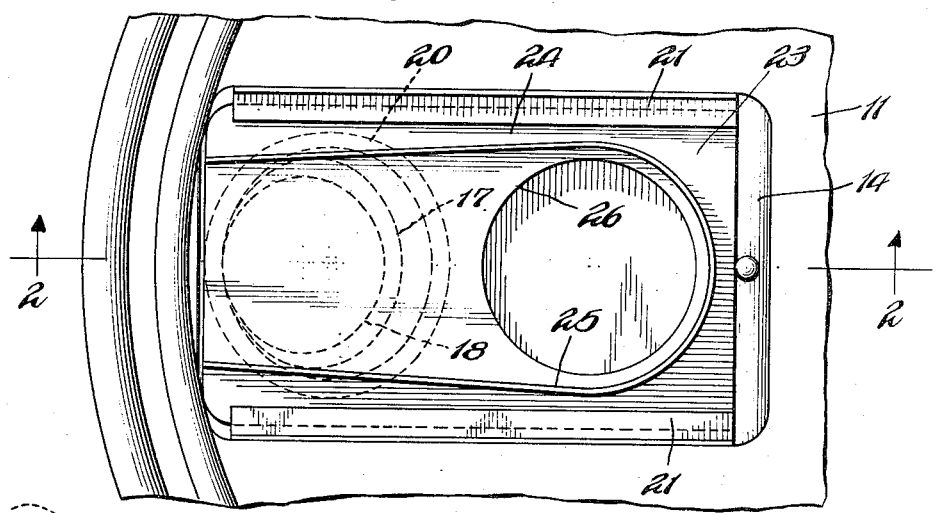
Figure 1 is a plan view of a portion of a pail or container showing my improved spout.
Figure 2:
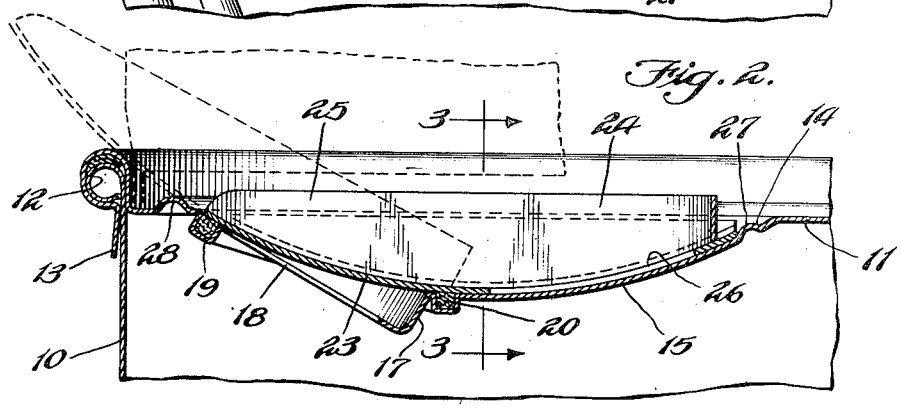
Figure 2 is a longitudinal sectional view taken on the line 2—2 of Figure 1.
Figures 3, 4:
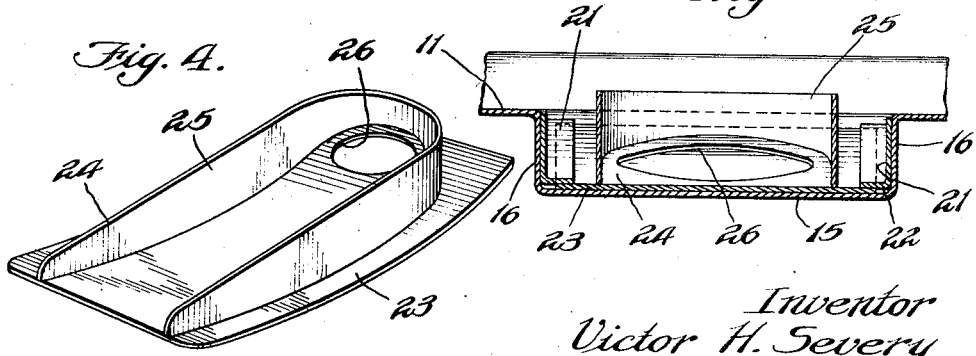
Figure 3 is a cross sectional view taken on the line 3—3 of Figure 1.
Figure 4 is a perspective view of the slidable spout.

The container 10 which is illustrated as being in the nature of a steel pail, is provided with a cover 11 which may be fixed or removably secured thereto. The form shown is that of a pail having a bead 12 and a removable cover having a depressed portion fitting within the inner walls of the container and providing means to permit stacking of the pails, this being a form of container commonly used, and having fastening lugs 13 for holding the same in closed position. At one side of the cover I provide a substantially radial depression 14 having a curved bottom wall 15 and side walls 16 as shown. The bottom wall 15 has a nozzle 17 which is preferably formed integrally therewith and which is arranged as close as convenient to the outer wall of the container as shown in Figure 2. The nozzle 17 is also preferably provided with an integrally formed knockout 18 to provide an outlet opening, this knockout serving as a closure until it is desired to open the can. The wall around the nozzle is formed into a channel 19 for receiving an annular gasket 20. The sides of the channel are preferably compressed after the gasket is inserted in order to hold the gasket securely in position with its upper surface substantially in alignment with the bottom wall 15 or projecting sufficiently to provide a closure with the spout.

The side walls 16 have rails or guides 21 to provide guideways 22 for the bottom plate 23 of the slidable spout indicated generally by the numeral 24.

The spout 24 has a substantially U-shaped wall or rim 25 extending upwardly from the bottom plate 23 which serves to guide the fluid and also serves as a thumb-piece or means for sliding the spout. The bottom plate 23 has a hole 26 which registers with the nozzle 17 when the spout is moved to pouring or projected position as shown in dotted lines in Figure 2. When it is in retracted position the bottom surface of the plate 23 contacts closely with the gasket 20 and serves as a closure for the nozzle or pouring opening. Any suitable means may be provided for limiting the movement of the spout or holding it in its guideways as for instance the stop or projection 27 which projects upwardly from the cover and which limits the inward movement of the spout to hold the same in closing position. An annular bead 28 may also be provided in the cover between the nozzle and the outer wall.

The pails are preferably filled and shipped with the covers secured thereto and the knock-out 18 left in position to provide a complete closure. When the filled pails are shipped or stored the nozzles will be retracted or slid to closing position as shown in full lines in Figure 2, which serves to completely close the nozzle and also permits the stacking of the pails in the usual manner. When the contents are to be poured out the nozzle is moved to pouring position as shown in dotted lines which brings the opening 26 in alignment with the nozzle. The knock-out is then freed to provide an opening for the nozzle and the contents may be poured out in a convenient manner. On account of the curved surface of the depression and the forward position of the nozzle it will be noted that practically all of the contents of the pail may be poured out, which is an important feature in devices of this kind. When a portion only of the contents is to be used the nozzle may be moved back to closing position and will serve as a satisfactory closure for storage purposes.

In the modified form of construction shown in Figures 5 to 8 the cover 30 is shown with a raised central portion 31 and a peripheral depression 32 between the central portion and the side wall of the cover. The top portion of the cover has a substantially radial depression 33 which is arranged adjacent to one side of the cover and which has a bottom wall 34 and substantially U-shaped periphery or side wall 35. The bottom wall 34 instead of being curved as above described, is substantially straight or flat and has a nozzle or pouring opening 36 which is initially closed by a knock-out 37 and an air vent opening 38 which is closed by a knock-out portion 39. The bottom wall is also provided with an annular groove or bead 40 around these openings which is provided with a gasket 41. The lower peripheral portion around the bottom wall 34 is folded to provide an inwardly extending flange 42 which defines a guideway or slideway 43 for the pouring spout 44. This spout has a flat bottom plate 45 that slidably engages with the grooves or guideway 43 and coacts with the gasket 41 to close the pouring opening when the spout is in retracted position. The bottom plate has a hole 46 which registers with the pouring opening when in advanced or pouring position. It is also provided with an upwardly extending guidewall 47 to complete the spout, which wall also serves as a finger piece for sliding the same. The bottom plate or slide 45 is also preferably provided with a stop 48 which engages with a stop 49 in the cover to limit the outward movement of the spout.

The bottom of the depression 33 is arranged at such an angle that the spout will clear the cover rim or bead when in projected or pouring position and will leave a free annular space when in retracted position to permit stacking of the pails.

The operation of this form is substantially the same as above described, but it will be noted that in this arrangement the nozzle is so positioned that practically all of the contents may also be discharged from the pail. From this description it will be seen that I provide an improved pail having novel pouring means of a simple and effective character. Furthermore the spout is in a protected position so that it will not be apt to be injured during shipping or handling and it may be readily moved from operative to inoperative position. While the drawings illustrate preferred forms of the invention the spout may be modified to apply to different forms of pails or containers. Therefore I do not wish to be limited to the particular design illustrated except as specified in the following claims, in which I claim:

1. A pail end having a depression therein with a curved bottom, a nozzle arranged adjacent to the outer end of the depression, a gasket secured in the cover around the nozzle, a pouring spout having a curved bottom engaging with the bottom of the depression and normally closing the nozzle and engaging with the gasket, said spout being adapted to be moved outwardly to pouring position and having an opening which registers with the nozzle when the spout is in pouring position.

2. The combination with a pail cover having a recess adjacent to one side thereof, an outlet opening in the bottom of the recess adjacent to the edge of the cover, a groove around the outlet, a gasket in said groove, guideways in the sides of the recess, and a pouring spout slidably mounted in the guideways having a wall engaging with the gasket and normally closing the outlet, and also having an opening which registers with the outlet opening when the spout is moved to pouring position at which time the outer end of the spout will extend over the side of the cover.

3. A container cover having a recess extending inwardly normal to the side thereof with a bottom wall curved longitudinally thereof, an integrally formed nozzle in the bottom wall adjacent to the outer portion thereof and having a knock-out portion for initially closing the same, a gasket positioned around the nozzle in the bottom wall, means for holding the gasket, longitudinal guideways in the recess, a pouring spout having a bottom plate curved to conform to the bottom of the recess and engaging with said guideways and coacting with the gasket to close the nozzle, an upwardly extending wall around the bottom plate to direct the fluid passing thereover, said bottom plate having a hole which registers with the nozzle when in pouring position, in which position the pouring spout extends over the side of the cover, said spout being substantially enclosed in the recess when in normal position.

4. A pail including a cover, having an integrally formed nozzle with an annular folded portion forming a groove around the nozzle, a gasket secured in said groove, guideways on the cover, and a pouring spout slidably mounted in said guideways and adapted to coact with said nozzle and gasket.

VICTOR H. SEVERY.